(12) United States Patent
Komatsu et al.

(10) Patent No.: US 10,913,508 B2
(45) Date of Patent: Feb. 9, 2021

(54) BICYCLE OPERATION DEVICE

(71) Applicant: Shimano Inc., Osaka (JP)

(72) Inventors: Atsushi Komatsu, Osaka (JP);
Takehiko Nakajima, Osaka (JP);
Takafumi Nishino, Osaka (JP)

(73) Assignee: Shimano Inc., Osaka (JP)

( * ) Notice: Subject to any disclaimer, the term of this patent is extended or adjusted under 35 U.S.C. 154(b) by 205 days.

(21) Appl. No.: 15/706,110

(22) Filed: Sep. 15, 2017

(65) Prior Publication Data

US 2018/0086413 A1 Mar. 29, 2018

(30) Foreign Application Priority Data

Sep. 29, 2016 (JP) ................. 2016-191956

(51) Int. Cl.
*G05G 1/00* (2006.01)
*B62K 23/06* (2006.01)
*B62L 3/02* (2006.01)
*B62M 25/08* (2006.01)

(52) U.S. Cl.
CPC .............. *B62K 23/06* (2013.01); *B62L 3/023* (2013.01); *B62M 25/08* (2013.01)

(58) Field of Classification Search
CPC ......... B62K 23/06; B62M 25/04; B62L 3/023
See application file for complete search history.

(56) References Cited

U.S. PATENT DOCUMENTS

| 8,061,667 | B2 | 11/2011 | Weiss et al. | |
| 9,073,596 | B2 | 7/2015 | McLaughlin et al. | |
| 2007/0000343 | A1* | 1/2007 | Ueno | B62K 23/06 74/473.12 |
| 2011/0253863 | A1 | 10/2011 | Weiss et al. | |
| 2014/0015659 | A1* | 1/2014 | Tetsuka | B62K 23/02 340/432 |
| 2014/0026710 | A1 | 1/2014 | Takeuchi et al. | |
| 2015/0000455 | A1* | 1/2015 | Hirotomi | B62K 23/06 74/491 |
| 2015/0291248 | A1* | 10/2015 | Fukao | B62K 23/02 74/501.6 |

FOREIGN PATENT DOCUMENTS

CN 1883999 A 12/2006
DE 24 29 812 A1 4/1975

\* cited by examiner

*Primary Examiner* — Jake Cook
(74) *Attorney, Agent, or Firm* — Global IP Counselors, LLP

(57) ABSTRACT

A bicycle operation device is provided that allows for easy operation of operation units. The bicycle operation device includes a clamp, a first operation unit and a second operation unit. The clamp is attachable to a handlebar of a bicycle. The first operation unit including an operation lever, and is coupled to the clamp. The second operation unit includes an electric switch and is attached to the clamp.

35 Claims, 14 Drawing Sheets

BICYCLE OPERATION DEVICE

CROSS-REFERENCE TO RELATED APPLICATIONS

This application claims priority to Japanese Patent Application No. 2016-191956, filed on Sep. 29, 2016. The entire disclosure of Japanese Patent Application No. 2016-191956 is hereby incorporated herein by reference.

BACKGROUND

Field of the Invention

The present invention generally relates to a bicycle operation device.

Background Information

A clamp is known in the art that is attached to a bicycle handlebar. In one example, a clamp is attachable to operation units such as a brake lever assembly and a shift lever assembly, U.S. Patent Application Publication No. 2011/0253863 (Patent Document 1) discloses one example of a prior art clamp.

SUMMARY

It is desirable that operation units attached to a clamp be easy to operate. Thus, one object of the present invention is to provide a bicycle operation device that allows for easy operation of operation units.

In accordance with a first aspect of the present invention, a bicycle operation device includes a clamp, a first operation unit and a second operation unit. The clamp is attachable to a handlebar of a bicycle. The first operation unit includes an operation lever and coupled to the clamp. The second operation unit includes an electric switch and attached to the clamp. Since the second operation unit includes an electric switch, the second operation unit is easy to operate.

In accordance with a second aspect of the present invention, in the bicycle operation device according to the first aspect, the second operation unit is detachably and reattachably attached to the clamp so as to be removable from the clamp and reattached to the clamp. This allows for easy attachment and removal of the second operation unit.

In accordance with a third aspect of the present invention, in the bicycle operation device according to the first or second aspect, the first operation unit includes a cylinder chamber and a piston movable in the cylinder chamber in accordance with an input to the operation lever. This realizes the first operation unit that uses hydraulic pressure.

In accordance with a fourth aspect of the present invention, in the bicycle operation device according to any one of the first to third aspects, the second operation unit further includes a wireless communicator. This simplifies wiring related to the second operation unit.

In accordance with a fifth aspect of the present invention, in the bicycle operation device according to any one of the first to fourth aspects, the second operation unit further includes a power supply. This eliminates the need for electrically connecting the bicycle operation device to a power supply located outside the bicycle operation device. Thus, the structure of the bicycle operation device is simplified.

In accordance with a sixth aspect of the present invention, in the bicycle operation device according to any one of the first to fifth aspects, the second operation unit further includes a notification portion. Thus, information is notified to the user.

In accordance with a seventh aspect of the present invention, in the bicycle operation device according to any one of the first to sixth aspects, the clamp includes a first clamp portion, a second clamp portion rotatable coupled to the first clamp portion, and a coupling member coupling the first clamp portion and the second clamp portion so as to hold the handlebar in between. Thus, the bicycle handlebar and the clamp are firmly coupled to each other.

In accordance with an eighth aspect of the present invention, in the bicycle operation device according to the seventh aspect, the first operation unit includes a held portion held between the first clamp portion and the second clamp portion. Thus, the clamp holds the bicycle handlebar and the first operation unit together.

In accordance with a ninth aspect of the present invention, in the bicycle operation device according to the eighth aspect, the held portion of the first operation unit includes an insertion portion allowing for insertion of the coupling member. Thus, the clamp and the first operation unit are firmly coupled to each other.

In accordance with a tenth aspect of the present invention, in the bicycle operation device according to any one of the seventh to ninth aspects, the second operation unit is attached to one of the first clamp portion and the second clamp portion. Thus, in a state where the second operation unit is attached to the clamp, the clamp is attachable to the handlebar.

In accordance with an eleventh aspect of the present invention, the bicycle operation device according to the tenth aspect further includes a third operation unit coupled to the other one of the first clamp portion and the second clamp portion. This allows the user to operate the second operation unit and the third operation unit with the same hand.

In accordance with a twelfth aspect of the present invention, the bicycle operation device according to any one of the first to eleventh aspects further includes an adapter provided between the clamp and the second operation unit. Thus, the second operation unit is easily attachable to the clamp.

In accordance with a thirteenth aspect of the present invention, in the bicycle operation device according to the twelfth aspect, the adapter is attached to an outer surface of the clamp. Thus, the adapter is easily attachable to the clamp.

In accordance with a fourteenth aspect of the present invention, in the bicycle operation device according to the twelfth or thirteenth aspect, the adapter includes a first attachment portion and a second attachment portion. The first attachment portion is attached to the clamp. The second attachment portion extends from the first attachment portion in a center axis direction of the clamp. The second operation unit is attached to the second attachment portion. This limits contact of the second operation unit with the clamp.

In accordance with a fifteenth aspect of the present invention, the bicycle operation device according to the fourteenth aspect further includes a first position adjustment mechanism configured to adjust a position of the second operation unit in the center axis direction. Thus, the position of the second operation unit is easy to adjust.

In accordance with a sixteenth aspect of the present invention, in the bicycle operation device according to the fifteenth aspect, the first position adjustment mechanism includes a guide structure guiding the second operation unit in the center axis direction, the guide structure includes a recess and a projection extending in the center axis direction, the recess is arranged in one of the second attachment portion and the second operation unit, and the projection is arranged on the other one of the second attachment portion and the second operation unit. Thus, the position of the second operation unit is continuously adjustable.

In accordance with a seventeenth aspect of the present invention, the bicycle operation device according to any one of the twelfth to sixteenth aspects further includes a second position adjustment mechanism configured to adjust a position of the adapter along an outer surface of the clamp. Thus, the position of the second operation unit is easy to adjust.

In accordance with an eighteenth aspect of the present invention, in the bicycle operation device according to any one of the first to seventeenth aspects, the electric switch includes at least a first switch and a second switch. This allows the user to operate the first switch and the second switch with the same hand.

In accordance with a nineteenth aspect of the present invention, the bicycle operation device according to the eighteenth aspect further includes a first operation member. The first operation member is operatively coupled to the first switch to operate the first switch in accordance with movement in a first direction. The first operation member is operatively coupled to the second switch to operate the second switch in accordance with movement in a second direction differing from the first direction. Thus, the structure of the second operation unit is simplified.

In accordance with a twentieth aspect of the present invention, in the bicycle operation device according to the eighteenth aspect, the second operation unit further includes a first operation member and a second operation member. The first operation member is configured to operate the first switch. The second operation member is configured to operate the second switch. Thus, the structure of the first operation member is simplified.

In accordance with a twenty-first aspect of the present invention, in the bicycle operation device according to the twentieth aspect, the first operation member includes a first lever pivotally disposed about a first axis, and the second operation member includes a second lever pivotally disposed about a second axis. Thus, the first operation member and the second operation member are easy to operate.

In accordance with a twenty-second aspect of the present invention, in the bicycle operation device according to the twenty-first aspect, the first lever pivots along a first operation surface orthogonal to the first axis, the second lever pivots along a second operation surface orthogonal to the second axis, and the first operation surface and the second operation surface form an angle that is greater than or equal to 20° and less than or equal to 70°. Thus, the first operation member and the second operation member are easy to operate.

In accordance with a twenty-third aspect of the present invention, in the bicycle operation device according to any one of the twentieth to twenty-second aspects, the first operation member is configured to be operated by a first digit of a user, and the second operation member is configured to be operated by a second digit of the user. Thus, the first operation member and the second operation member are easy to operate.

In accordance with a twenty-fourth aspect of the present invention, in the bicycle operation device according to any one of the first to seventeenth aspects, the electric switch includes only a first switch, and the second operation unit further includes a first operation member configured to operate the first switch. Thus, the structure of the second operation unit is simplified.

In accordance with a twenty-fifth aspect of the present invention, the bicycle operation device according to any one of the nineteenth to twenty-fourth aspects further includes an operation position adjustment mechanism configured to adjust an initial position of the first operation member. Thus, the initial position of the first operation member is easy to adjust.

In accordance with a twenty-sixth aspect of the present invention, in the bicycle operation device according to any one of the nineteenth to twenty-fifth aspects, the first operation member includes an operation surface used to operate the first switch, and an additional operation member provided on the first operation member at a position other than the operation surface. This allows the user to operate the first switch and the additional operation member with the same hand.

In accordance with a twenty-seventh aspect of the present invention, the bicycle operation device according to any one of the nineteenth to twenty-sixth aspects further includes a reversing structure that allows the first operation member to be arranged on one side of the clamp or the other side of the clamp with respect to a center axis direction of the clamp. Thus, the position of the first operation member is selectable with respect to the clamp.

In accordance with a twenty-eighth aspect of the present invention, in the bicycle operation device according to the fourth aspect, the second operation unit further includes a housing accommodating the wireless communicator and allowing for transmission of a radio wave output from the wireless communicator. This allows for communication of the wireless communicator in a satisfactory radio wave state.

(29) In accordance with a twenty-ninth aspect of the present invention, in the bicycle operation device according to the twenty-eighth aspect, the housing includes a housing front portion serving as a front half of the housing, and a housing rear portion serving as a rear half of the housing. The, wireless communicator is accommodated in the housing rear portion. This widens the space of the housing front portion for locating other elements.

In accordance with a thirtieth aspect of the present invention, in the bicycle operation device according to the twenty-eighth aspect, the housing includes a housing front portion serving as a front half of the housing, and a housing rear portion serving as a rear half of the housing. The, wireless communicator is accommodated in the housing front portion. This widens the space of the housing rear portion for locating other elements.

In accordance with a thirty-first aspect of the present invention, in the bicycle operation device according to any one of the twenty-eighth to thirtieth aspects, the housing includes a housing upper portion serving as an upper half of the housing, and a housing lower portion serving as a lower half of the housing. The, wireless communicator is accommodated in the housing upper portion. This widens the space of the housing lower portion for locating other elements.

In accordance with a thirty-second aspect of the present invention, in the bicycle operation device according to any one of the twenty-eighth to thirtieth aspects, the housing includes a housing upper portion serving as an upper half of the housing, and a housing lower portion serving as a lower half of the housing. The wireless communicator is accommodated in the housing lower portion. This widens the space of the housing upper portion for locating other elements.

In accordance with a thirty-third aspect of the present invention, in the bicycle operation device according to any one of the twenty-eighth to thirty-second aspects, the housing includes a resin material. This reduces the weight of the second operation unit.

In accordance with a thirty-fourth aspect of the present invention, in the bicycle operation device according to the fifth aspect, the second operation unit further includes a housing including a receptacle configured to at least partially accommodate the power supply, and a power supply cover covering at least a portion of an opening provided in the receptacle. The power supply cover is attachable to and removable from the housing. Thus, the power supply is protected.

In accordance with a thirty-fifth aspect of the present invention, in the bicycle operation device according to the thirty-fourth aspects, the power supply includes a battery and a battery holder, and the battery is detachably and reinstallably attached to the battery holder so as to be removable from the battery holder and reinstallable to the battery holder. This facilitates replacement of the battery.

The above bicycle operation device allows for easy operation of the operation units.

BRIEF DESCRIPTION OF THE DRAWINGS

Referring now to the attached drawings which form a part of this original disclosure.

EMBODIMENTS OF THE INVENTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
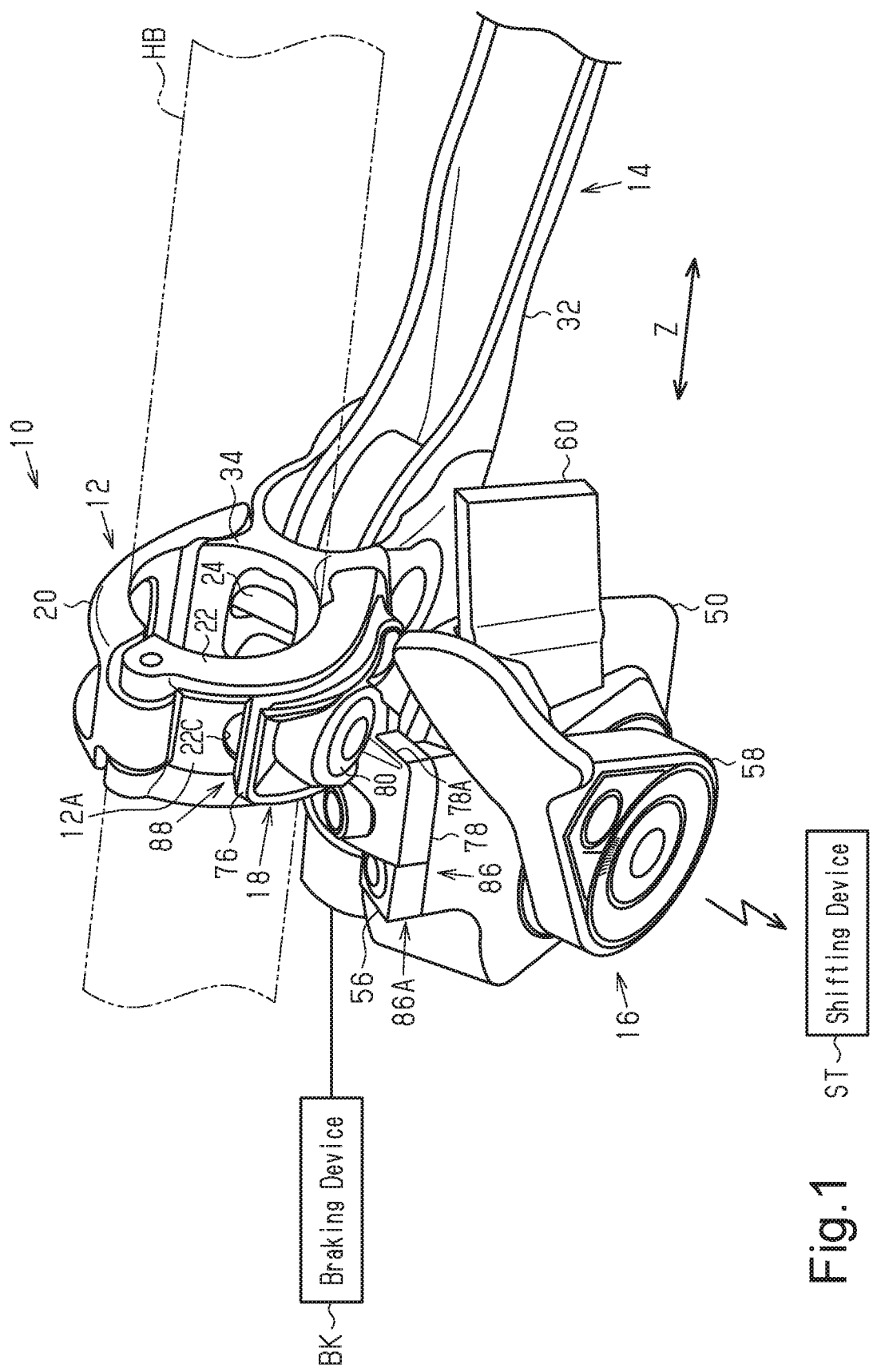
FIG. 1 is a perspective view of a bicycle operation device in accordance with a first embodiment.

As shown in FIG. 1, a bicycle operation device 10 is attached to, for example, a handlebar HB of a mountain bike. The bicycle operation device 10 includes a clamp 12, a first operation unit 14, and a second operation unit 16. The clamp 12 is attachable to the handlebar HB of the bicycle. The first operation unit 14 is coupled to the clamp 12. The second operation unit 16 is attached to the clamp 12. In one example, the second operation unit 16 is detachably and reattachably attached to the clamp 12 so as to be removable from the clamp 12 and reattached to the clamp 12. One example of the first operation unit 14 is a braking operation unit that operates a hydraulic braking device BK. One example of the second operation unit 16 is a shifter that operates a shifting device ST. The shifting device ST includes at least one of a front shifting device and a rear shifting device.

The bicycle operation device 10 further includes an adapter 18. The adapter 18 is attached to an outer surface 12A of the clamp 12. The adapter 18 is provided between the clamp 12 and the second operation unit 16. The second operation unit 16 is detachably and reattachably attached to the adapter 18 so as to be removable from the adapter 18 and reattached to the adapter 18.

Figure 2:
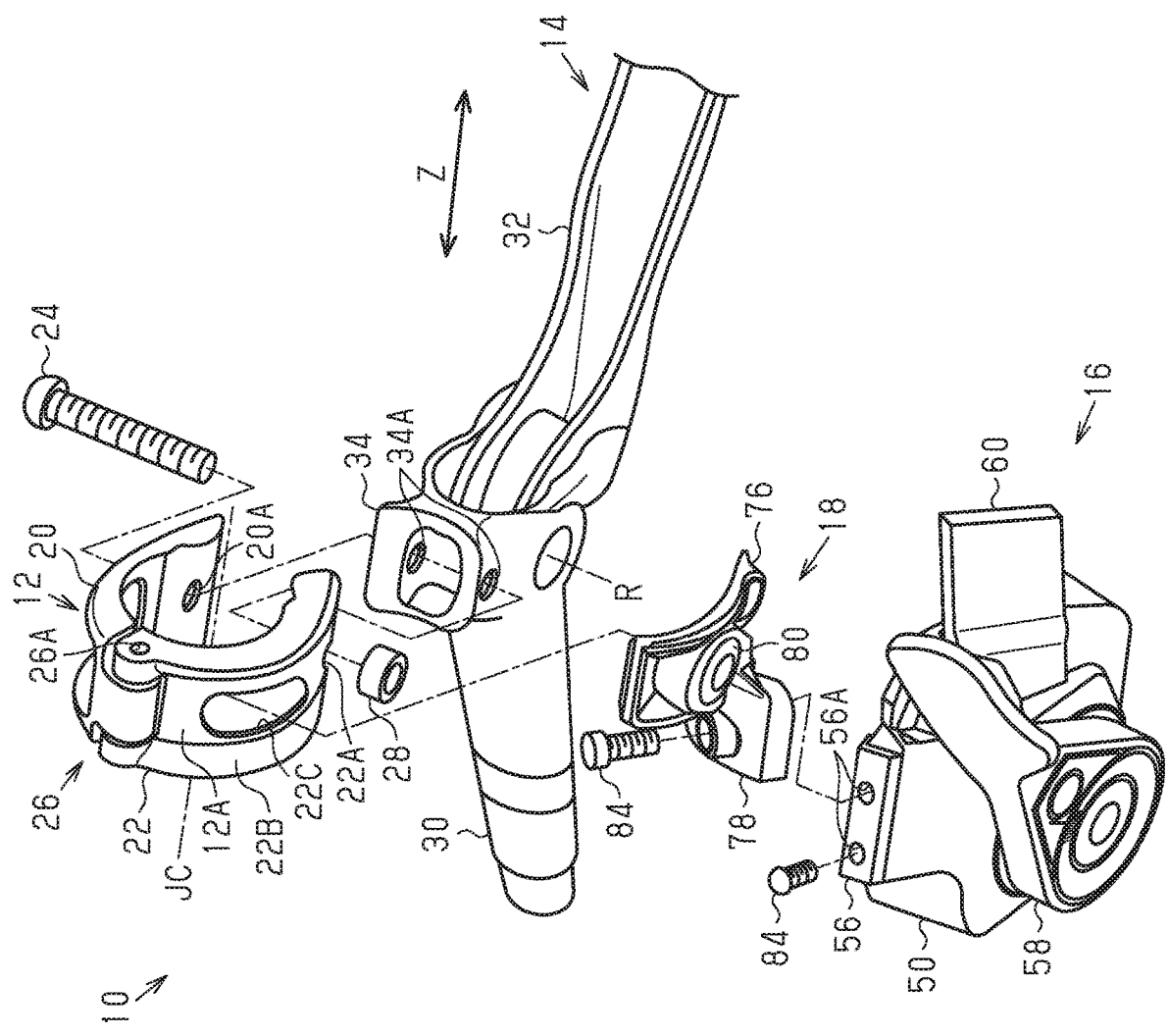
FIG. 2 is an exploded perspective view showing the bicycle operation device of FIG. 1.

As shown in FIG. 2, the clamp 12 includes a first clamp portion 20, a second clamp portion 22, and a coupling member 24. In one example, the clamp 12 is C-shaped in a side elevational view of the clamp 12. The clamp 12 further includes a hinge portion 26. The hinge portion 26 includes a coupling pin 26A. The first clamp portion 20 and the second clamp portion 22 are rotatably coupled to each other. In one example, the first clamp portion 20 and the second clamp portion 22 are coupled so as to be rotatable about the coupling pin 26A. The coupling member 24 couples the first clamp portion 20 and the second clamp portion 22 to each other so as to hold the handlebar FIB (refer to FIG. 1) in between. One example of the coupling member 24 is a bolt. The clamp 12 further includes a fastening member 28. One example of the fastening member 28 is a nut that is attachable to the coupling member 24.

The first clamp portion 20 includes a first insertion hole 20A. The second clamp portion 22 includes a second insertion hole 22A and a recess 22B. The coupling member 24 is inserted into the insertion holes 20A and 22A. The recess 22B extends in a circumferential direction of the second clamp portion 22. The recess 22B includes an elongated hole 22C. The elongated hole 22C extends in the circumferential direction of the second clamp portion 22.

The first operation unit 14 includes a housing 30 and an operation lever 32. The operation lever 32 is pivotally disposed about a rotation axis R relative to the housing 30. The first operation unit 14 includes a held portion 34. In the illustrated example, the held portion 34 is formed integrally with the housing 30. In another example, the held portion 34 is formed separately from the housing 30 and fixed to the housing 30. The held portion 34 is held between the first clamp portion 20 and the second clamp portion 22. The held portion 34 includes an insertion portion 34A. The coupling member 24 is insertable into the insertion portion 34A. The held portion 34 is held between the clamp portions 20 and 22. The coupling member 24 is inserted into the first insertion hole 20A, the insertion portion 34A and the second insertion hole 22A. The fastening member 28 is attached to an end portion of the coupling member 24. Consequently, the first operation unit 14 is attached to the clamp 12.

Figure 3:
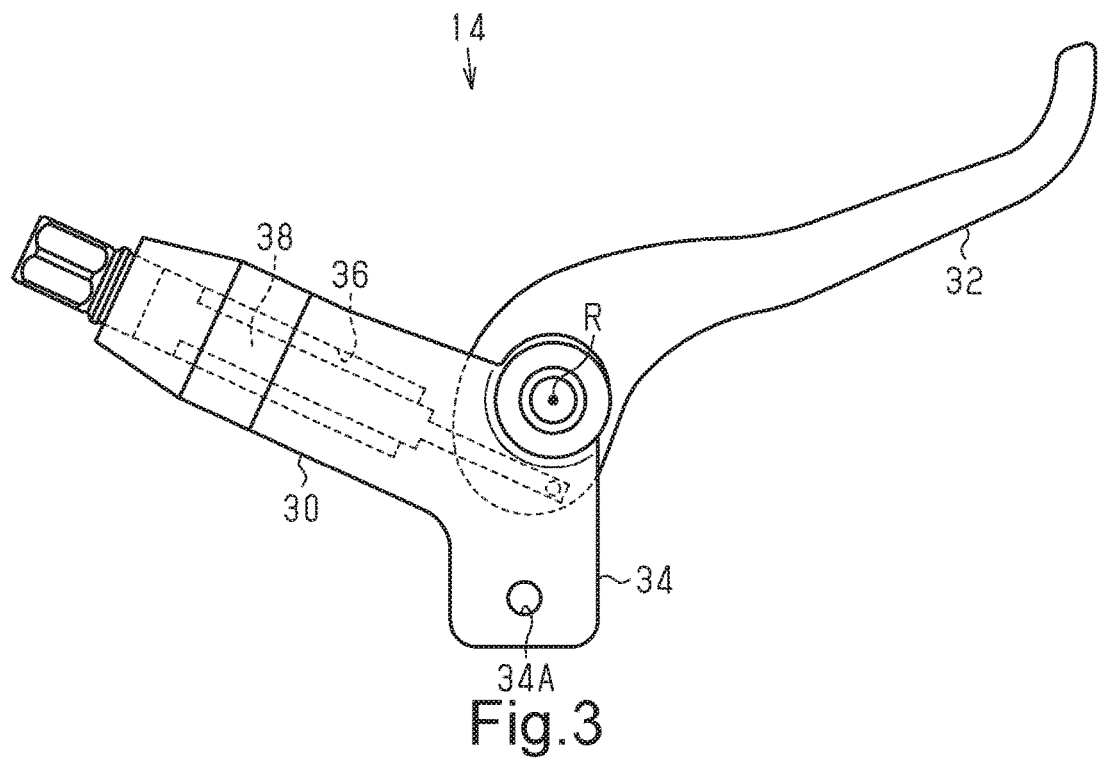
FIG. 3 is a top view of a first operation unit of the bicycle operation device of FIG. 1 in which the first operation unit has an operation lever.

As shown in FIG. 3, the first operation unit 14 further includes a cylinder chamber 36 and a piston 38. The housing 30 includes the cylinder chamber 36. The cylinder chamber 36 is filled with, for example, hydraulic oil. The piston 38 is movable in the cylinder chamber 36 in accordance with an input to the operation lever 32. The piston 38 is rotatably coupled to the operation lever 32. In a case where the operation lever 32 is operated, the piston 38 is pushed in to apply the hydraulic pressure to the braking device BK (refer to FIG. 1).

Figure 4:
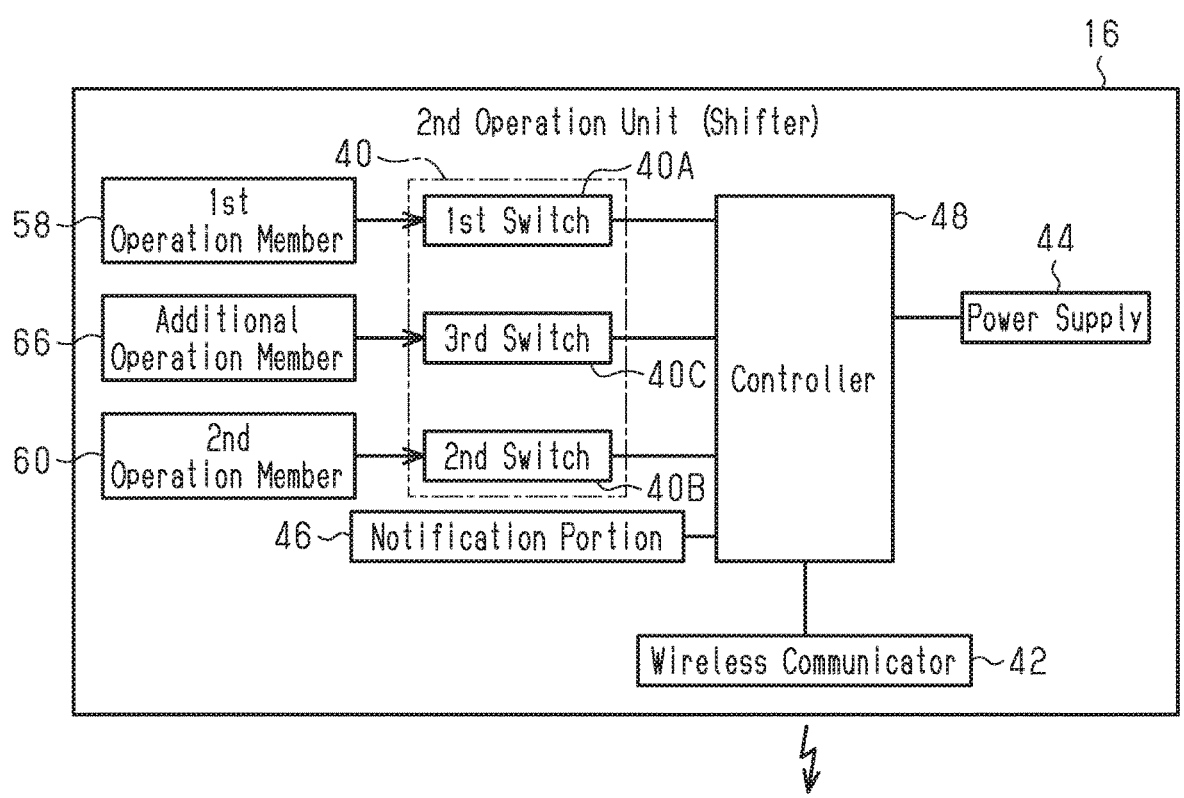
FIG. 4 is a block diagram showing an electrical configuration of a second operation unit of the bicycle operation device of FIG. 1.

As shown in FIG. 4, the second operation unit 16 includes an electric switch 40. The second operation unit 16 further includes a wireless communicator 42, a power supply 44, a notification portion 46, and an electronic controller 48 (hereinafter "the controller 48"). The controller 48 includes, for example, a microprocessor. The controller 48 includes one or more processors and one or more computer memory devices. The controller 48 can also include general circuits such as an input interface circuit and an output interface circuit. The wireless communicator 42 is communicable with the shifting device ST (refer to FIG. 1), which is one example of a bicycle component. The wireless communicator 42 includes an antenna. The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any oilier type of signal suitable for wireless communications as understood in the bicycle field.

The power supply 44 is connected to each of the electric switch 40, the wireless communicator 42, the notification portion 46 and the controller 48 by electric wires (not shown). The notification portion 46 outputs information. The information includes, for example, at least one of information related to the first operation unit 14, information related to the second operation unit 16, and information input to the bicycle operation device 10 from an external device. The notification portion 46 includes, for example, an LED or a buzzer. In other words, the term "notification portion" refers a physical device that outputs at least one of a haptic notification, a visual notification and an audio notification.

The electric switch 40 is configured to transmit signals to the wireless communicator 42. The electric switch 40 includes at least a first switch 40A and a second switch 40B. The electric switch 40 further includes a third switch 40C. Each of the switches 40A, 40B and 40C transmits an ON signal to the controller 48. In a case where the controller 48 receives the ON signal from each of the switches 40A, 40B, and 40C, the controller 48 transmits a control signal corresponding to the received ON signal to the wireless communicator 42. The wireless communicator 42 transmits the received control signal, for example, to the shifting device ST. In another example, the electric switch 40 directly transmits the signals to the wireless communicator 42.

Figure 5:
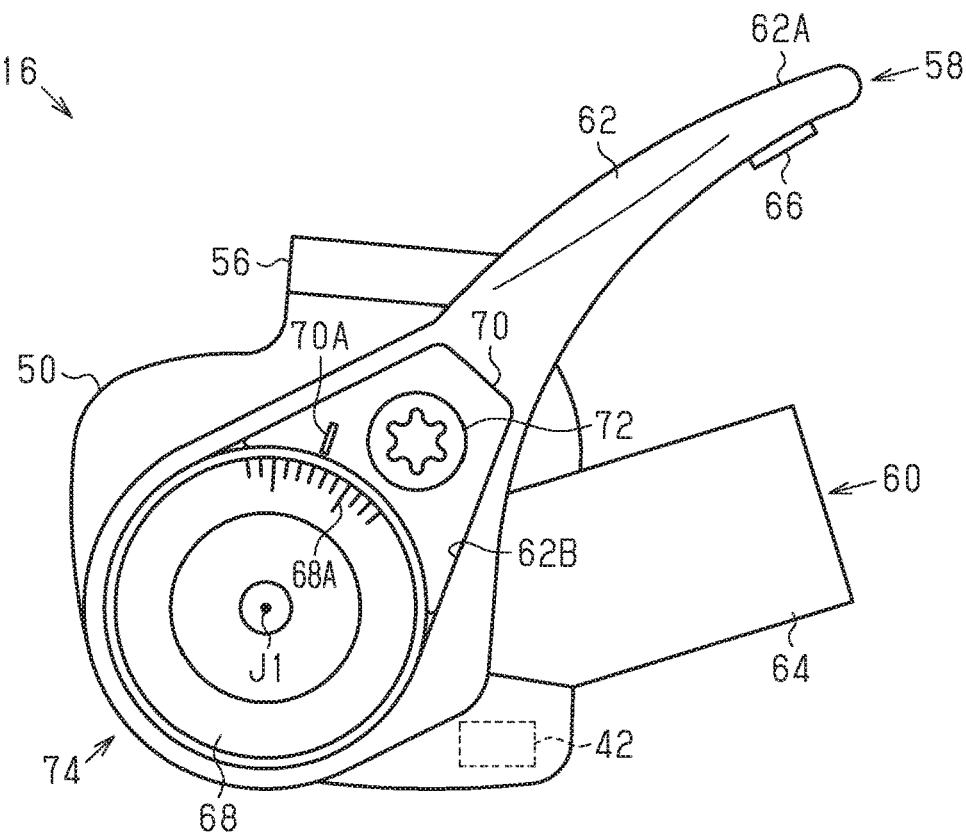
FIG. 5 is a bottom view of the second operation unit having a first operation member and a second operation member.

As shown in FIG. 5, the second operation unit 16 includes a housing 50. The housing 50 accommodates the wireless communicator 42. The housing 50 further accommodates the electric switch 40, the power supply 44, the notification portion 46, and the controller 48 (refer to FIG. 4). The housing 50 allows for transmission of radio waves that are output by the wireless communicator 42. The housing 50 includes, for example, a resin material.

The housing 50 includes a housing front portion 50A, which serves as the front half of the housing 50, and a housing rear portion 50B, which serves as the rear half of the housing 50. The housing 50 includes a housing upper portion 50C, which serves as the upper half of the housing 50, and a housing lower portion 50D, which serves as the lower half of the housing 50.

Figure 6:
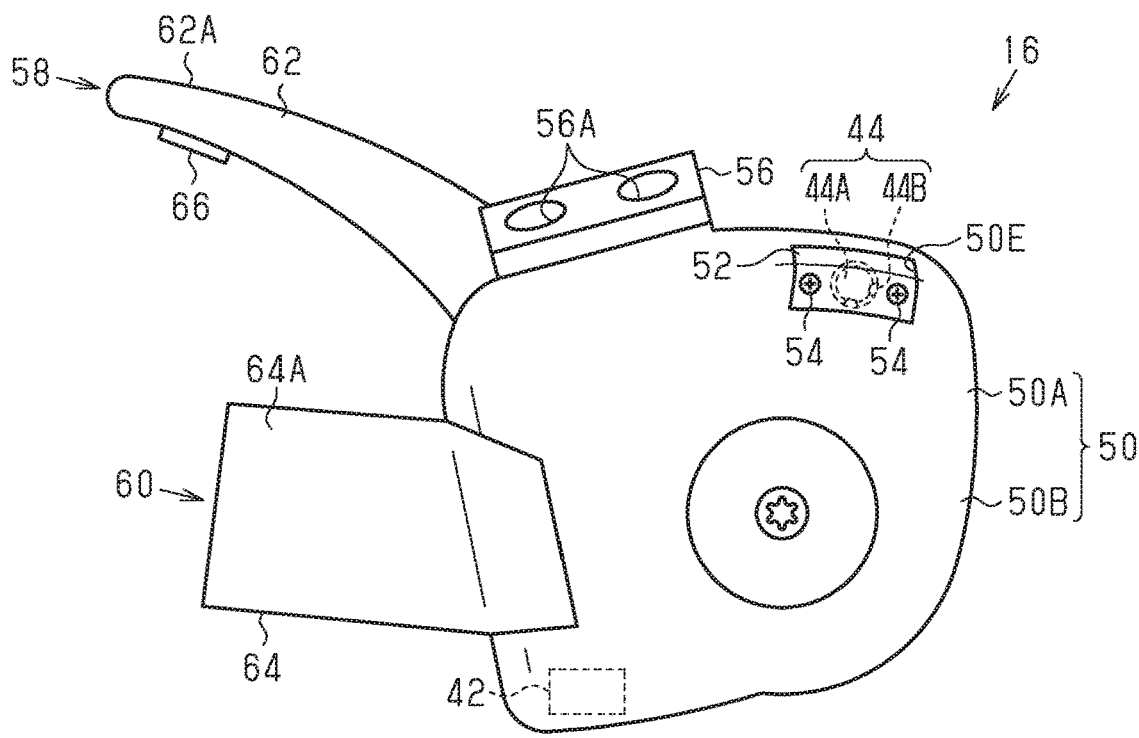
FIG. 6 is a top view of the second operation unit having the first operation member and the second operation member.
Figure 7:
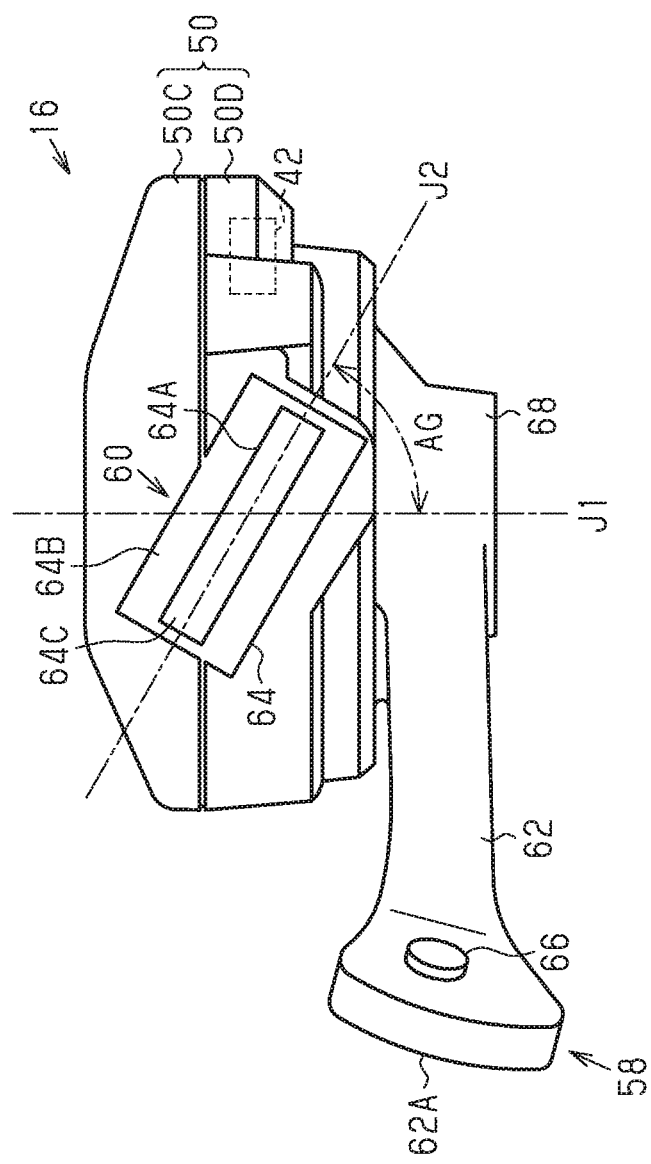
FIG. 7 is a side elevational view of the second operation unit having the first operation member and the second operation member.

As shown in FIG. 6, the wireless communicator 42 is accommodated in the housing rear portion 50B. As shown in FIG. 7, the wireless communicator 42 is accommodated in the housing rear portion 50B and the housing lower portion 50D. The wireless communicator 42 is fixed to the housing 50. In another example, the wireless communicator 42 is attached to the housing 50 so as to be removable from the housing 50.

As shown in FIG. 6, the second operation unit 16 includes a receptacle 50E and a power supply cover 52. The receptacle 50E is configured to accommodate at least a portion of the power supply 44. The receptacle 50E, which is shown in FIG. 6, accommodates the entire power supply 44. The receptacle 50E is provided in the housing front portion 50A and the housing lower portion 50D (refer to FIG. 7). The power supply 44 includes a battery 44A and a battery holder 44B. The battery 44A is detachably and reattachably attached to the battery holder 44B so as to be removable from the battery holder 44B and reinstalled in the battery holder 44B. The power supply cover 52 at least partially covers an opening provided in the receptacle 50E. The power supply cover 52, which is shown in FIG. 6, covers the entire receptacle 50E. The power supply cover 52 is attachable to and removable from the housing 50. The power supply cover 52 includes a plurality of bolts 54. The bolts 54 couples the power supply cover 52 to the housing 50.

The second operation unit 16 further includes a projection 56. The projection 56 is fixed to the housing 50. In one example, the projection 56 is fixed to the housing front portion 50A and the housing lower portion 50D. In another example, the projection 56 is attached to the housing 50 so as to be removable from the housing 50. The projection 56 is formed from a material that differs from the material of the housing 50. One example of the material of the projection 56 is aluminum. The projection 56 includes a plurality of fastening holes 56A. In one example, the projection 56 includes two fastening holes 56A. Each of the fastening holes 56A is defined by a wall surface that is internally threaded. Bolts 84 are coupled to the fastening holes 56A.

The second operation unit 16 further includes a first operation member 58 and a second operation member 60. The first operation member 58 is operatively coupled to the first switch 40A to operate the first switch 40A. The second operation member 60 is operatively coupled to the second switch 40B to operate the second switch 40B. The first operation member 58 is operated, for example, for shift-up. The second operation member 60 is operated, for example, for a shift-down.

As shown in FIG. 7, the first operation member 58 includes a first lever 62. The first lever 62 is pivotally disposed about a first axis J1. The first lever 62 pivots along a first operation surface that is orthogonal to the first axis J1. The second operation member 60 includes a second lever 64. The second lever 64 is pivotally disposed about a second axis J2. The second lever 64 pivots along a second operation surface that is orthogonal to the second axis J2. The first operation surface and the second operation surface form an angle AG that is greater than or equal to 20° and less than or equal to 70°. In one example, the angle AG is 60°.

The second operation member 60 includes an operation surface 64A, which is used to operate the second switch 40B (refer to FIG. 4). In one example, the operation surface 64A is arranged on the second lever 64. The second lever 64 includes a rotation portion 64B and an operation portion 64C. The rotation portion 64B and the operation portion 64C are formed integrally with each other. The rotation portion 64B is arranged coaxially with the second axis J2. In one example, the rotation portion 64B is tubular. The second operation member 60 further includes an elastic member (not shown). The elastic member is provided in the rotation portion 64B so that force that returns the second operation member 60 to an initial position is applied to the second operation member 60. One example of the elastic member is a coil spring.

The first operation member 58 includes an operation surface 62A and an additional operation member 66. The operation surface 62A is used to operate the first switch 40A. The additional operation member 66 is operatively coupled to the third switch 40C to operate the third switch 40C. In one example, the operation surface 62A is provided on the first lever 62. The additional operation member 66 is provided on the first operation member 58 at a position other than the operation surface 62A. The position other than the operation surface 62A is, for example, a surface of the first lever 62 located at the rear side of the operation surface 62A. In a first example related to the additional operation member 66, the additional operation member 66 is operated to perform pairing on the bicycle operation device 10 and a bicycle component. In one example, the bicycle operation device 10 attached to the right side of the handlebar HB can be paired with one of the front shifting device and the rear shifting device. The bicycle operation device 10 attached to the left side of the handlebar HB can be paired with the other one of the front shifting device and the rear shifting device. In a second example related to the additional operation member 66, the additional operation member 66 is operated to switch the actuation state of an electric suspension or adjust the height of an electric seatpost.

As shown in FIG. 5, the first operation member 58 further includes a rotation member 68, two coupling portions 70 and a bolt 72. The first lever 62 includes a receptacle 62B. The receptacle 62B accommodates the rotation member 68, the coupling portions 70, and the bolt 72. The first operation member 58 further includes an elastic member (not shown). The elastic member is provided in the rotation member 68 so that force that returns the first operation member 58 to an initial position is applied to the first operation member 58. One example of the elastic member is a coil spring.

The rotation member 68 is arranged coaxially with the first axis J1. The rotation member 68 includes calibrations 68A that are used to adjust the initial position of the first operation member 58. In one example, the calibrations 68A are provided along the circumference of the surface of the rotation member 68. In a state where the coupling portions 70 are accommodated in the receptacle 62B, the coupling portions 70 are attached to the first lever 62. The coupling portions 70 include a calibration 70A that is used to adjust the initial position of the first operation member 58. The coupling portions 70 further include an elastic member (not shown). Insertion of the bolt 72 into the coupling portions 70 compresses the elastic member. The compressed elastic member is partially coupled to the rotation member 68. This couples the coupling portions 70 to the rotation member 68. In this state, the first lever 62, the coupling portions 70, and the rotation member 68 are integrally rotated about the first axis J1.

The second operation unit 16 further includes an operation position adjustment mechanism 74, which is configured to adjust the initial position of the first operation member 58. The operation position adjustment mechanism 74 includes the first lever 62, the rotation member 68, the two coupling portions 70 and the bolt 72. The operation position adjustment mechanism 74 adjusts the initial position of the first operation member 58 by changing the rotational position of the first lever 62 about the first axis J1 relative to the rotation member 68. Loosening of the bolt 72 inserted into the coupling portions 70 uncouples the coupling portions 70 and the rotation member 68. In this state, the first lever 62 and the coupling portions 70 are rotated about the first axis J1 relative to the rotation member 68. This allows the initial position of the first operation member 58 to be adjusted.

Figure 8:
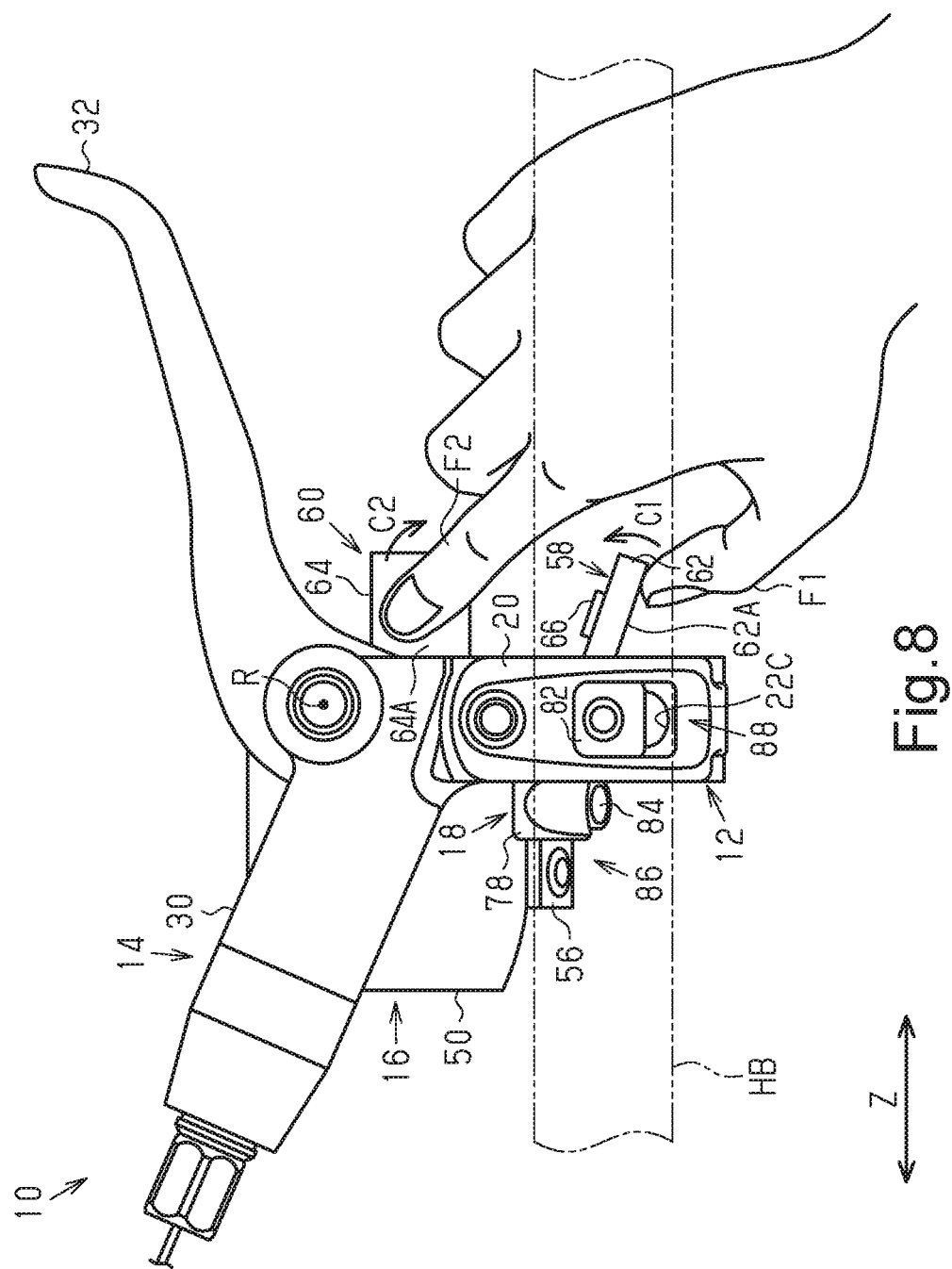
FIG. 8 is a top plan view of the bicycle operation device of FIG. 1 with a user's hand operating the first and second operation members of the second operation unit.

As shown in FIG. 8, the first operation member 58 is configured to be operated by a first digit F1 of the user. The second operation member 60 is configured to be operated by a second digit F2 of the user. In a case where the first lever 62 is pushed in a first operation direction C1, the first switch 40A (refer to FIG. 4) is set to an on state. In a case where the first lever 62 is returned to the initial position, the first switch 40A is set to an off state. In a case where the second lever 64 is pushed in a second operation direction C2, the second switch 40B (refer to FIG. 4) is set to an on state. In a case where the second lever 64 is returned to the initial position, the second switch 40B is set to an off state.

Figure 9:
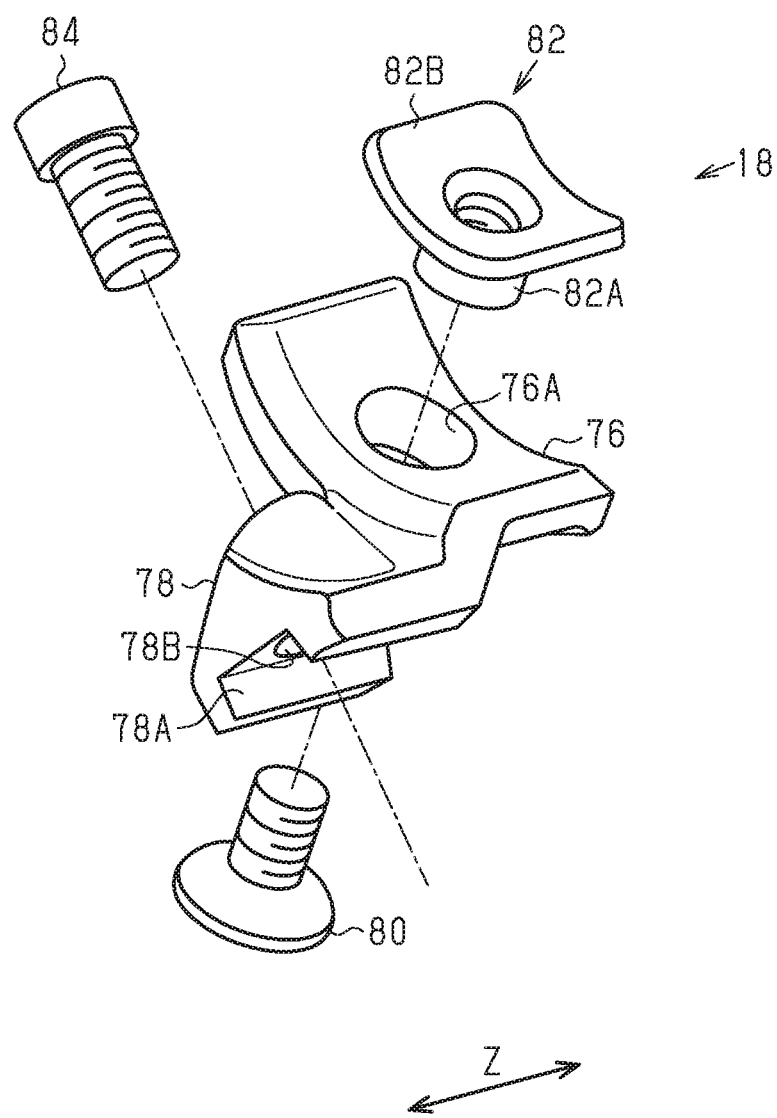
FIG. 9 is an exploded perspective view showing an adapter of the bicycle operation device of FIG. 1.

As shown in FIG. 9, the adapter 18 includes a first attachment portion 76 and a second attachment portion 78. The adapter 18 further includes a bolt 80 and a nut 82, which attach the first attachment portion 76 to the clamp 12 (refer to FIG. 2), and a bolt 84, which attaches the second operation unit 16 (refer to FIG. 2) to the second attachment portion 78.

The first attachment portion 76 is attached to the clamp 12. The first attachment portion 76 is curved in conformance with the outer surface 12A (refer to FIG. 2) of the clamp 12. The first attachment portion 76 includes an insertion hole 76A. The second attachment portion 78 extends from the first attachment portion 76 in a center axis direction Z of the clamp 12. The center axis direction Z of the clamp 12 is the direction that extends along a central axis JC (refer to FIG. 2) of the clamp 12. The second attachment portion 78 includes a recess 78A and an insertion hole 78B. The recess 78A is a groove that extends in the center axis direction Z. Opposite ends of the recess 78A are open in end surfaces of the second attachment portion 78. The insertion hole 78B is provided in the bottom of the recess 78A.

The bolt 80 and the nut 82 hold the first attachment portion 76 in between. The nut 82 includes an insertion portion 82A and a flange 82B. The insertion portion 82A is inserted into the insertion hole 76A of the first attachment portion 76. The inner circumferential surface of the insertion portion 82A is internally threaded. The flange 82B is curved in conformance with an inner surface of the clamp 12. The bolt 80 is coupled to the internal threads of the insertion portion 82A. The bolt 84 is inserted into the insertion hole 78B of the second attachment portion 78.

As shown in FIG. 2, the first attachment portion 76 is attached to the outer surface 12A of the clamp 12 to cover the elongated hole 22C. The nut 82 (refer to FIG. 9) is attached to the inner surface of the clamp 12. The first attachment portion 76 and the nut 82 hold the second clamp portion 22 of the clamp 12 in between. The insertion portion 82A (refer to FIG. 9) of the nut 82 is inserted into the elongated hole 22C. The bolt 80 is coupled to the nut 82, which is inserted into the elongated hole 22C. The coupling of the bolt 80 to the nut 82 attaches the adapter 18 to the second clamp portion 22 of the clamp 12.

The second operation unit 16 is attached to one of the first clamp portion 20 and the second clamp portion 22. In the illustrated example, the second operation unit 16 is attached to the second clamp portion 22. The second operation unit 16 is attached to the second attachment portion 78. The projection 56 of the second operation unit 16 is fitted into the recess 78A of the second attachment portion 78. The bolt 84 is coupled to one of the fastening holes 56A through the insertion hole 78B. Consequently, the second operation unit 16 is attached to the second attachment portion 78. The bolt 84 is coupled to the other one of the fastening holes 56A. This hinders entrance of foreign matter into the other one of the fastening holes 56A. In another example, the second operation unit 16 is attached to the first clamp portion 20. The adapter 18 is provided between the first clamp portion 20 and the second operation unit 16.

Figure 10:
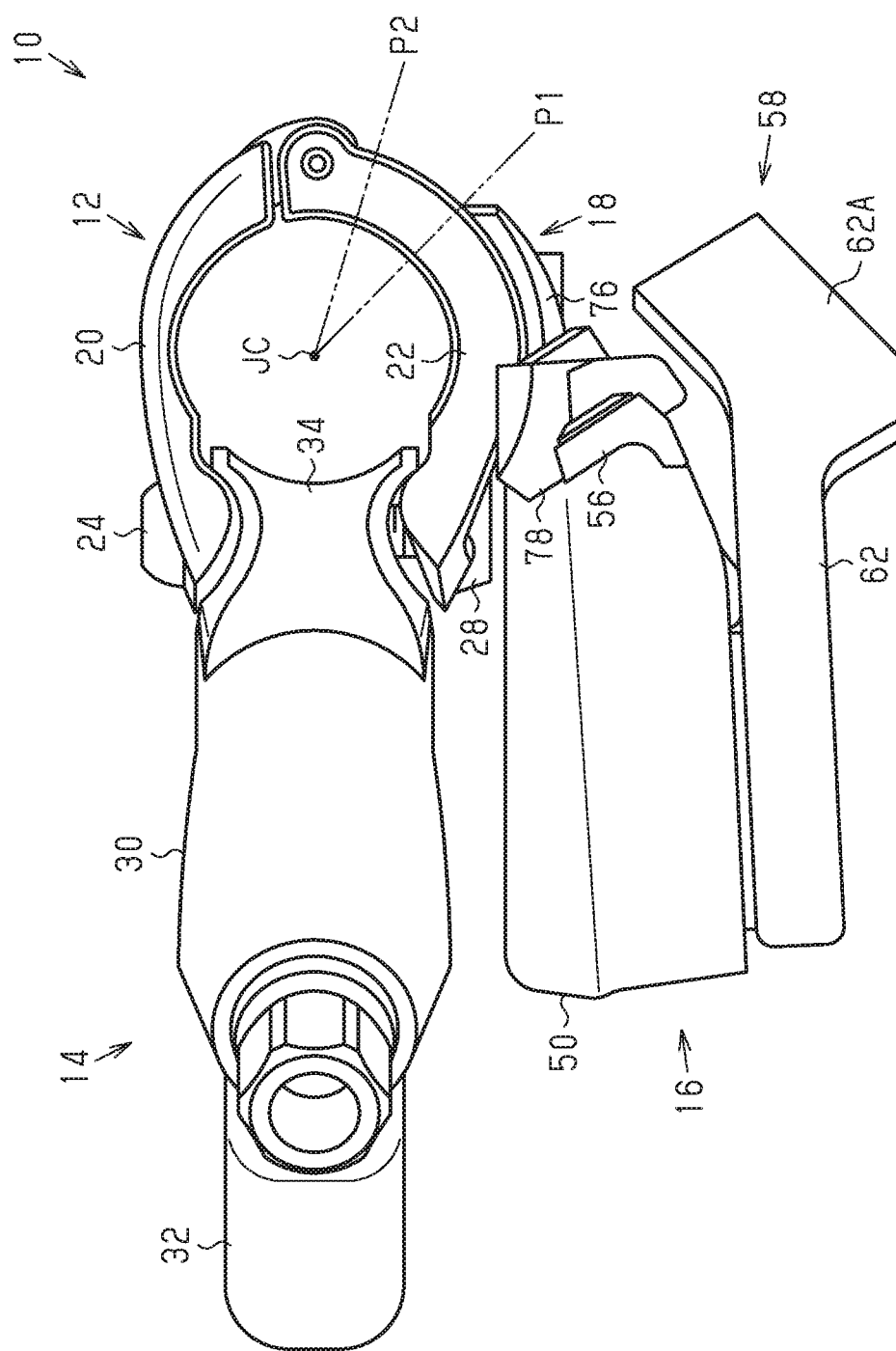
FIG. 10 is a side elevational view of the bicycle operation device of FIG. 1.
Figure 11:
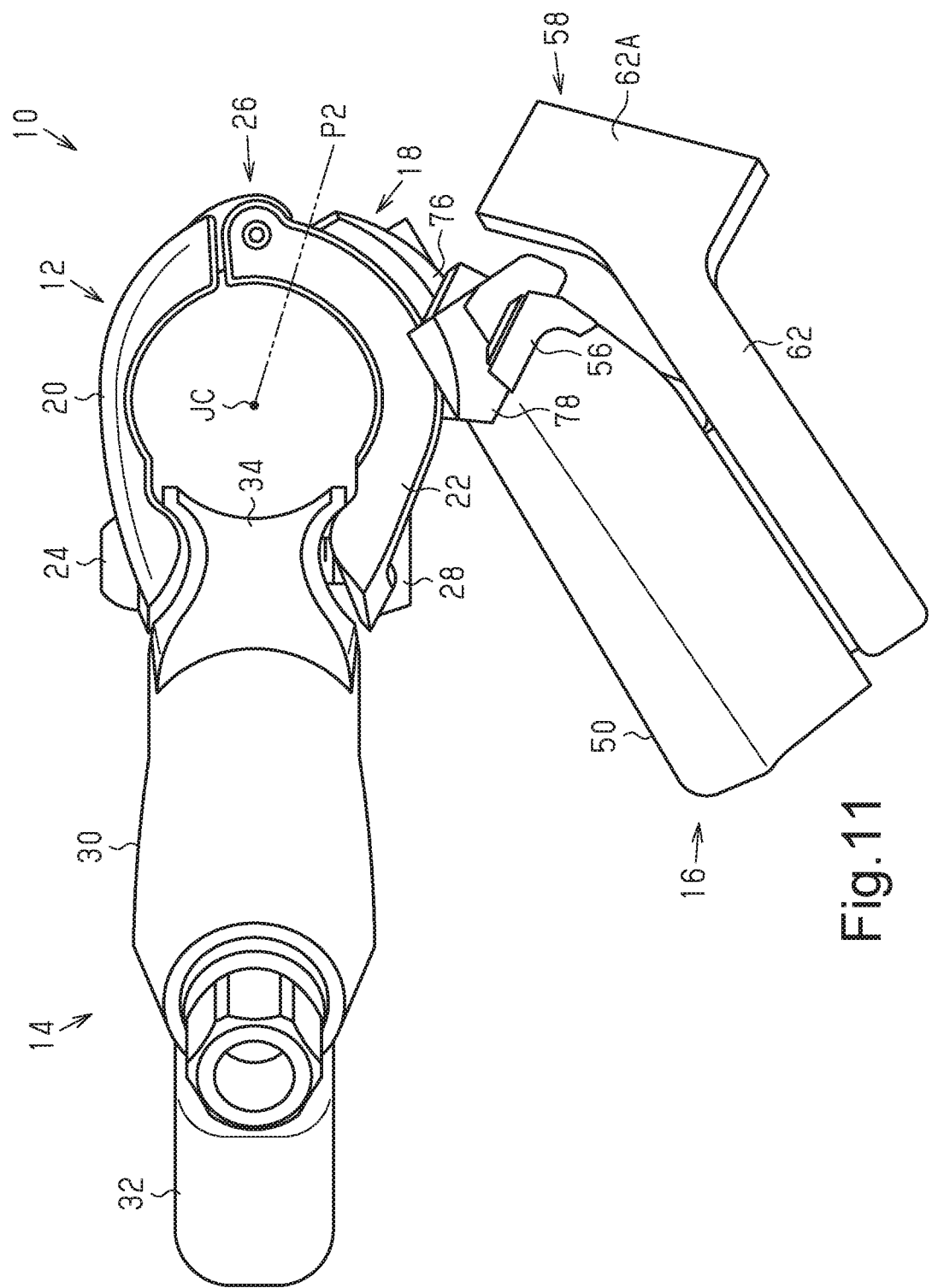
FIG. 11 is another side elevational view of the bicycle operation device of FIG. 1.

As shown in FIG. 1, the bicycle operation device 10 further includes a first position adjustment mechanism 86. The bicycle operation device 10 further includes a second position adjustment mechanism 88. The first position adjustment mechanism 86 is configured to adjust the position of the second operation unit 16 in the center axis direction Z. The second position adjustment mechanism 88 is configured to adjust the position of the adapter 18 along the outer surface 12A of the clamp 12 in a range from a position P1, which is shown in FIG. 10, to a position P2, which is shown in FIG. 11. The second position adjustment mechanism 88 includes the elongated hole 22C of the clamp 12, the first attachment portion 76, the bolt 80, and the nut 82 (refer to FIG. 9).

As shown in FIG. 1, the first position adjustment mechanism 86 includes a guide structure 86A, which guides the second operation unit 16 in the center axis direction Z. The guide structure 86A includes the recess 78A and the projection 56, which extend in the center axis direction Z. The recess 78A is provided in the second attachment portion 78 of the adapter 18. The projection 56 is provided on the second operation unit 16. The projection 56 is slidable and fitted into the recess 78A in the center axis direction Z. In another example, the recess 78A is provided in the second operation unit 16. The projection 56 is provided on the second attachment portion 78.

Second Embodiment

Figure 12:
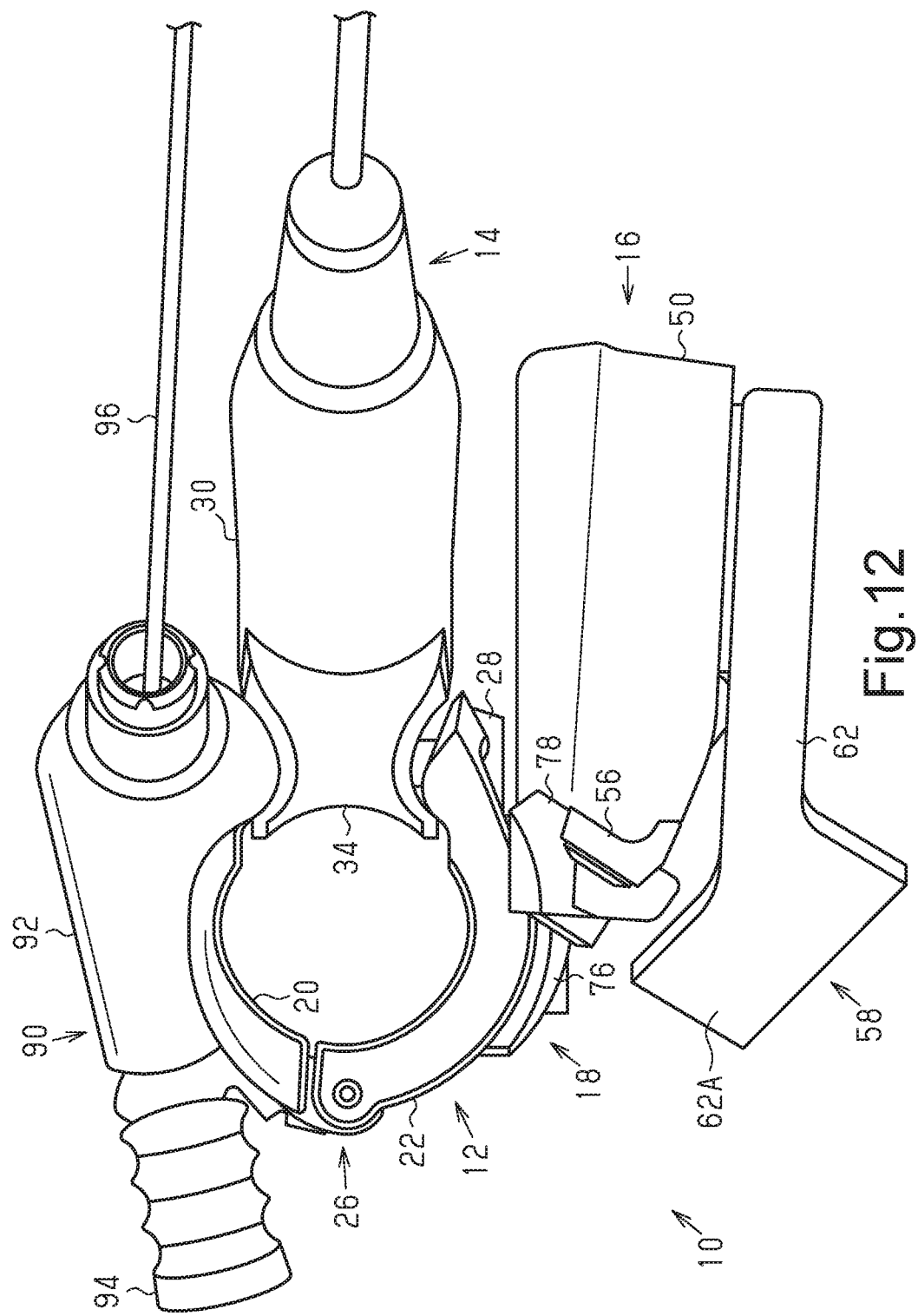
FIG. 12 is a side elevational view of a bicycle operation device in accordance with a second embodiment.

As shown in FIG. 12, a second embodiment of the bicycle operation device 10 further includes a third operation unit 90. The third operation unit 90 is operated to actuate a bicycle component. In the illustrated example, the third operation unit 90 is operated to actuate the suspension (not shown) of the bicycle. In another example, the third operation unit 90 is operated to actuate the seatpost of the bicycle.

The second operation unit 16 is attached to one of the first clamp portion 20 and the second clamp portion 22. The third operation unit 90 is coupled to the other one of the first clamp portion 20 and the second clamp portion 22. In the illustrated example, the second operation unit 16 is attached to the second clamp portion 22. The third operation unit 90 is coupled to the first clamp portion 20. In another example, the second operation unit 16 is attached to the first clamp portion 20. The third operation unit 90 is coupled to the second clamp portion 22.

Figure 13:
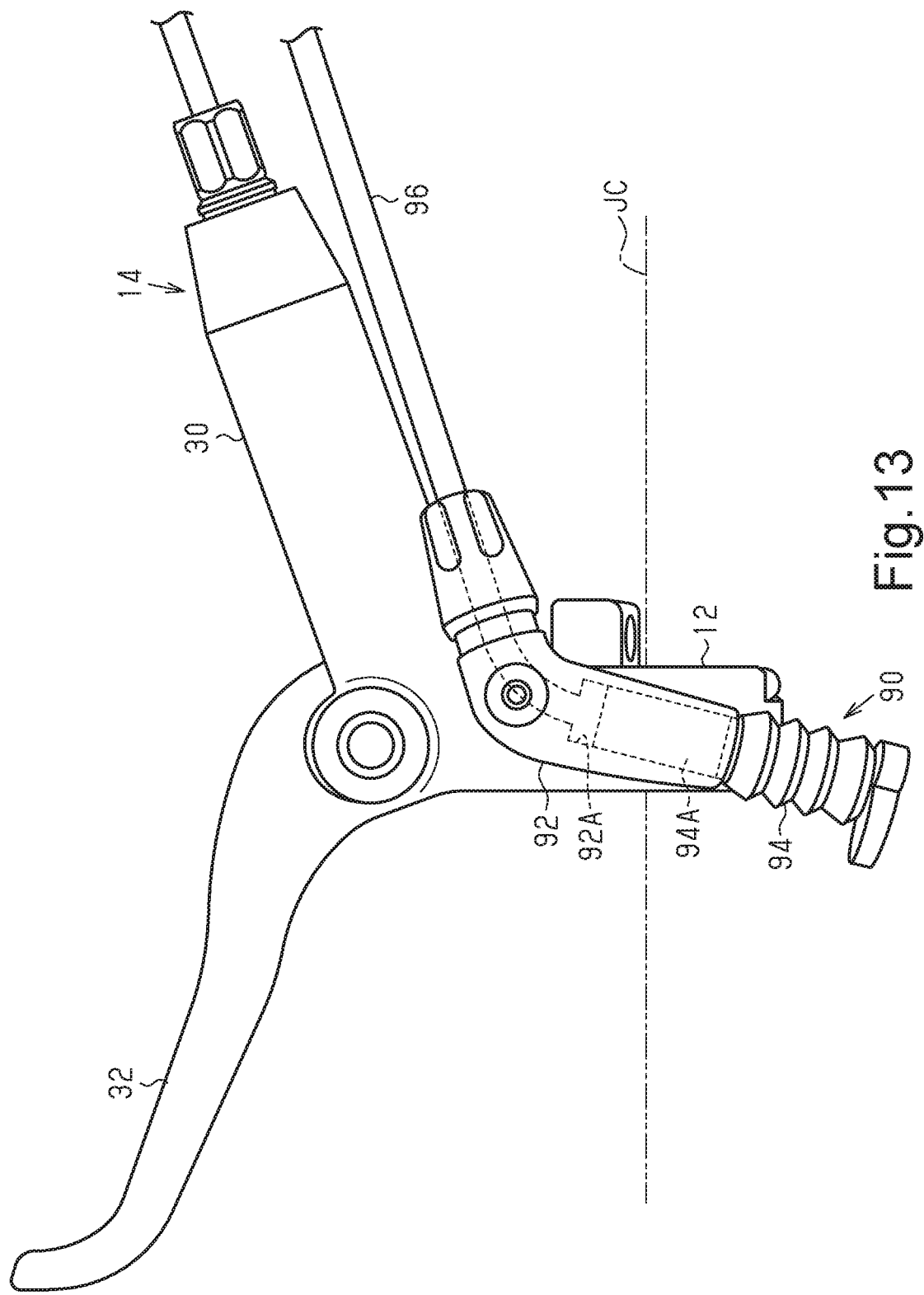
FIG. 13 is a top plan view of the bicycle operation device of FIG. 12, from which the second operation unit is omitted.

As shown in FIG. 13, the third operation unit 90 includes a housing 92, an operation member 94, and a tube 96. The housing 92 is provided integrally with the first clamp portion 20. The housing 92 includes a cylinder chamber 92A. The cylinder chamber 92A is filled with hydraulic oil. The operation member 94 includes a piston 94A. The piston 94A is provided in the cylinder chamber 92A so that the piston 94A is movable relative to the housing 92. One end of the tube 96 is coupled to the cylinder chamber 92A. The other end of the tube 96 is coupled to the suspension. In a case where the operation member 94 is operated to move to a first operation position, the suspension is maintained in a lockout state. In a case where the operation member 94 is operated to move to a second operation position, the suspension is released from the lockout state.

Modifications

The above description illustrates embodiments of a bicycle operation device according to the present invention and is not intended to be restrictive. The above embodiments of the bicycle operation device according to the present invention can be modified, for example, as follows. Further, two or more of the modifications can be combined.

The position where the additional operation member 66 is provided can be changed to any position. In one example, the additional operation member 66 is provided on the second operation member 60. It is preferred that the additional operation member 66 be provided on the second operation member 60 at a position other than the operation surface 64A. The position other than the operation surface 64A is, for example, a surface of the second operation member 60 located at the rear side of the operation surface 64A.

Figure 14:
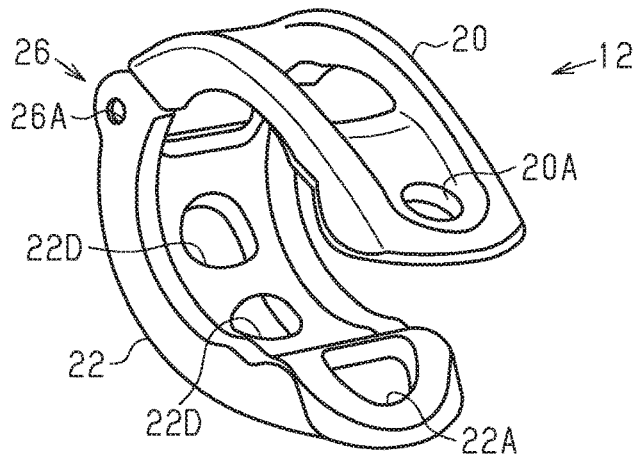
FIG. 14 is a perspective view of a first modification of a clamp for the bicycle operation devices of FIGS. 1 and 12.

The second position adjustment mechanism 88 can be changed to any structure. In one example, as a first modification is shown in FIG. 14, the second position adjustment mechanism 88 includes a plurality of holes 22D provided in the circumferential direction of the clamp 12.

Figure 15:
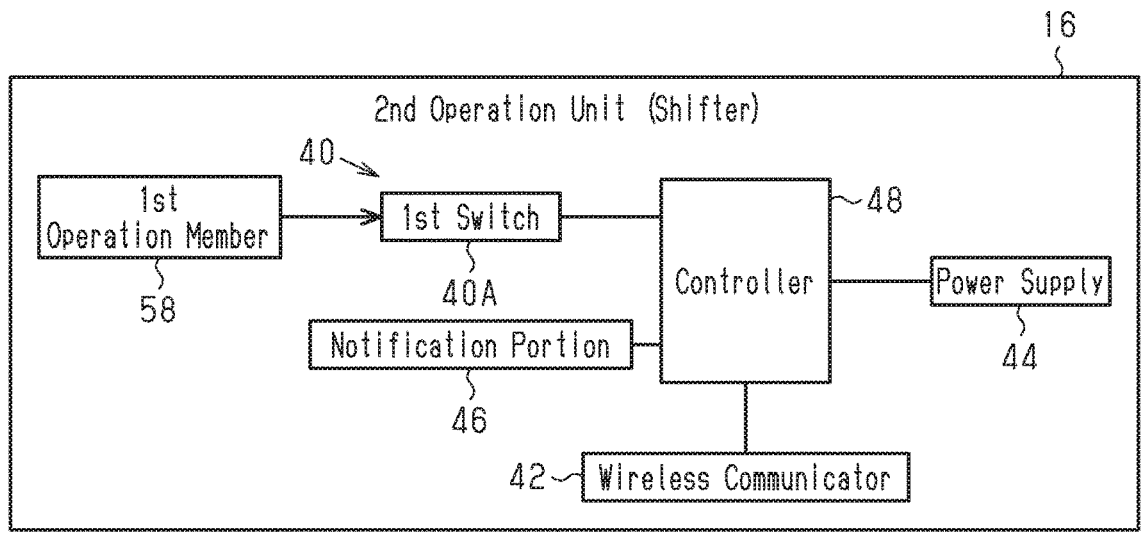
FIG. 15 is a block diagram showing an electrical configuration of a second modification of a second operation unit.
Figure 16:
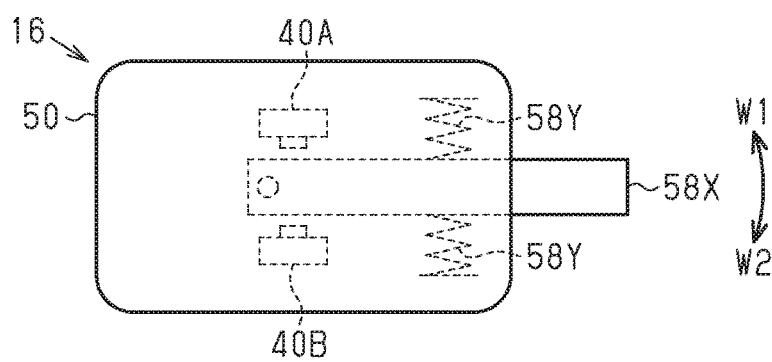
FIG. 16 is a front view of a third modification of a second operation unit.

The second operation unit 16 can be changed to any structure. In a first example, as a second modification is shown in FIG. 15, the second operation unit 16 includes only the first switch 40A among the switches 40A, 40B and 40C. The second operation unit 16 further includes the first operation member 58, which is used to operate the first switch 40A. In a second example, as a third modification is shown in FIG. 16, the second operation unit 16 further includes two elastic members 58Y. The housing 50 accommodates the switches 40A and 40B. The switches 40A and 40B are provided at opposite sides of the first operation member 58X. The first operation member 58X is pivotally disposed relative to the housing 50. The two elastic members 58Y apply force to the first operation member 58 so that the first operation member 58 is returned to a neutral position. The first operation member 58X operates the first switch 40A in accordance with movement in a first direction W1. The first operation member 58X operates the second switch 40B in accordance with movement in a second direction W2 that differs from the first direction W1.

Figure 17:
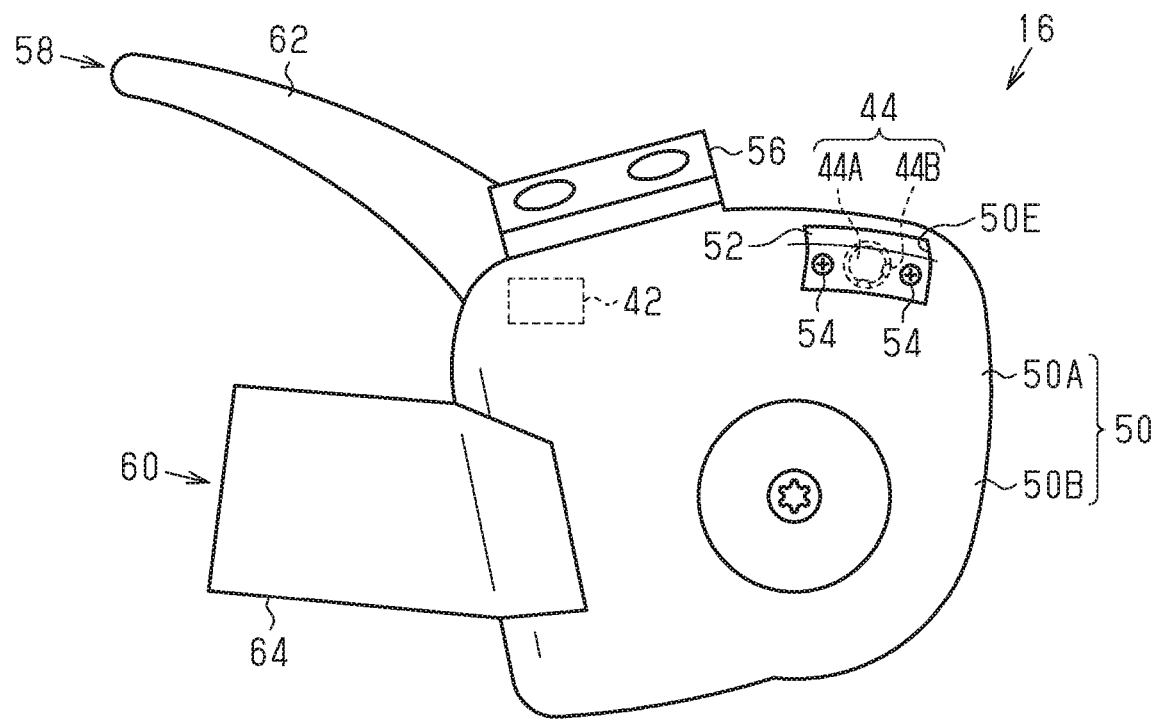
FIG. 17 is a bottom view of a fourth modification of a second operation unit.
Figure 18:
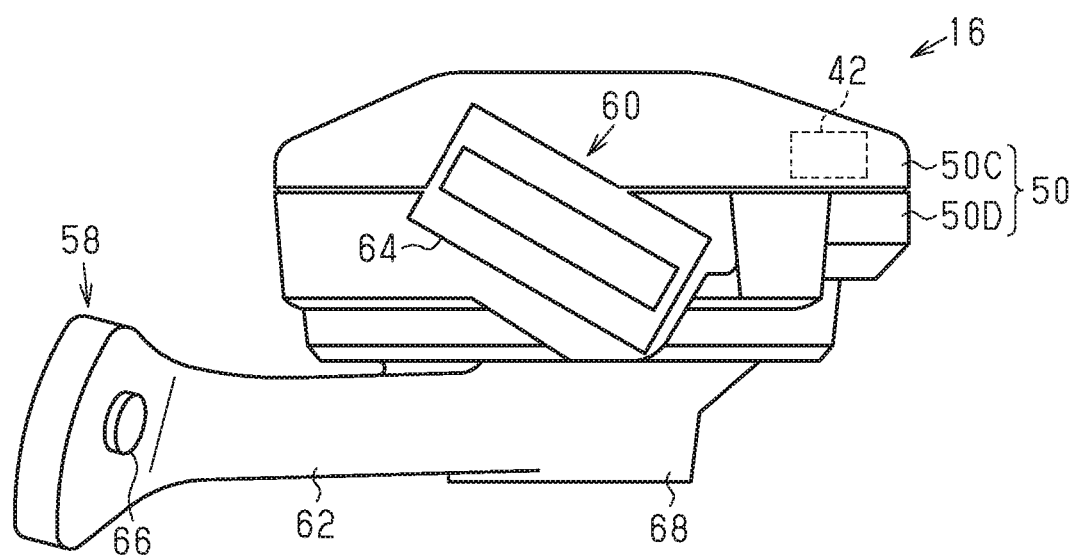
FIG. 18 is a side elevational view of a fifth modification of a second operation unit.

The arrangement of the wireless communicator 42 in the housing 50 can be changed to any arrangement. In a first example, as a fourth modification is shown in FIG. 17, the wireless communicator 42 is accommodated in the housing front portion 50A of the housing 50. In a second example, as a modification example is shown in FIG. 18, the wireless communicator 42 is accommodated in the housing upper portion 50C of the housing 50.

The structure for fixing the coupling member 24 to the clamp 12 can be changed to any structure. In one example, instead of the fastening member 28, at least one of the first insertion hole 20A and the second insertion hole 22A is internally threaded. The coupling member 24 is fastened to the internal threads.

Figure 19:
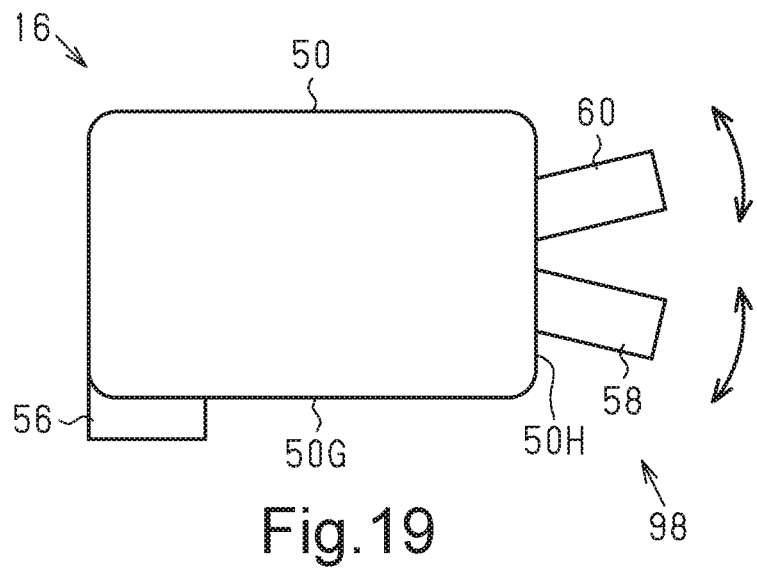
FIG. 19 is a top plan view showing a of modification of a second operation unit.
Figure 20:
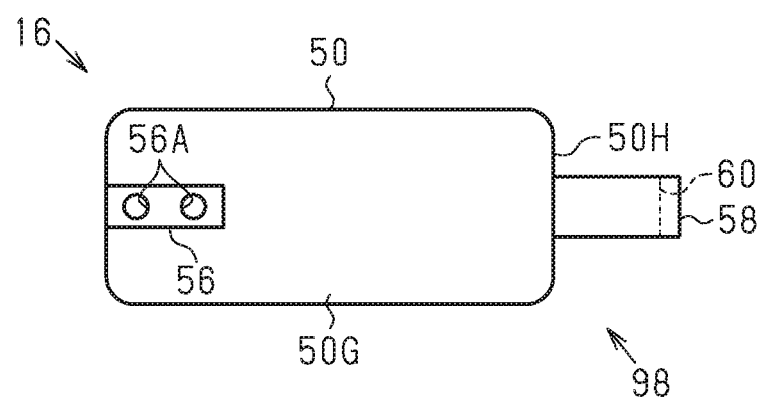
FIG. 20 is a side elevational view of the second operation unit of FIG. 19.

The structure for attaching the first operation member 58 to the clamp 12 can be changed to any structure. In one example, as a sixth modification is shown in FIGS. 19 and 20, the second operation unit 16 includes a reversing structure 98, which allows the first operation member 58 to be arranged to one side of the clamp 12 or the other side of the clamp 12 with respect to the center axis direction Z of the clamp 12. The second operation unit 16 can be set to a first arrangement state, in which the second operation unit 16 is located at the right side of a center plane of the bicycle arranged in a front-rear direction of the bicycle, and a second arrangement state, in which the second operation unit 16 is located at the left side of the center plane of the bicycle. The first arrangement state is obtained by attaching the clamp 12 to the right side of the handlebar HB. The second arrangement state is obtained by attaching the clamp 12 to the left side of the handlebar HB. The reversing structure 98 is the structure for setting the relationship between the second operation unit 16 that is in the first arrangement state and the second operation unit 16 that is in the second arrangement state to be symmetrical about the center plane of the bicycle. As shown in FIG. 19, the housing 50 includes a first side surface 50B and a second side surface 50H. The first side surface 50G is provided in a longitudinal direction of the handlebar HB at the side of the adapter 18. The second side surface 50H is arranged in a height-wise direction of the housing 50 and intersects with a direction parallel to the longitudinal direction of the handlebar HB. Each of the operation members 58 and 60 is provided in the housing 50 to project from a width-wise center portion of the housing 50 at the second side surface 50H of the housing 50. The projection 56 is provided on the first side surface 50G at the width-wise center portion of the housing 50.

The mode for associating the second operation unit 16 of the bicycle operation device 10 with the bicycle components can be changed to any mode. In a first example, the second operation unit 16 is operated to switch the actuation state of the electric suspension. One of the first operation member 58 and the second operation member 60 is operated to maintain the electric suspension in the lockout state and release the electric suspension from the lockout. In a second example, the second operation unit 16 is operated to adjust the height of the electric seatpost. One of the first operation member 58 and the second operation member 60 is operated to increase the height of the electric seatpost. The other one of the first operation member 58 and the second operation member 60 is operated to lower the height of the electric seatpost. In a third example, the second operation unit 16 is operated to actuate the shifting device ST and one of the electric suspension and the electric seatpost. In a first specific example related to the third example, one of the first operation member 58 and the second operation member 60 is operated to switch the actuation state of the electric suspension. The other one of the first operation member 58 and the second operation member 60 is operated to actuate the front shifting device. In a second specific example of the third example, one of the first operation member 58 and the second operation member 60 is operated to adjust the height of the electric seatpost. The other one of the first operation member 58 and the second operation member 60 is operated to actuate the front shifting device.

The housing 50 can be changed to any stricture. In one example, the housing 50 includes the housing upper portion 50C and the housing lower portion 50D that are formed separately from each other. The housing upper portion 50C is coupled to the housing lower portion 50D by a coupling structure to form the housing 50. This housing 50 can have, for example, a first structure and a second structure. In the first structure, the housing lower portion 50D includes the receptacle 50E. Instead of the power supply cover 52, which is shown in FIG. 6, the housing upper portion 50C includes a power supply cover that protects the power supply 44. The power supply cover 52 is omitted. In the second structure, the housing upper portion 50C includes the receptacle 50E. Instead of the power supply cover 52, which is shown in FIG. 6, the housing lower portion 50D includes a power supply cover that protects the power supply 44. The power supply cover 52 is omitted. The coupling structure includes, for example, a bolt or a fitting structure. In a case where the coupling structure include a bolt, the housing upper portion 50C and the housing lower portion 50D are fastened by the bolt to form the housing 50. In a case where the coupling structure includes a fitting structure, a projection provided on one of the housing upper portion 50C and the housing lower portion 50D is fitted into a recess provided in the other one of the housing upper portion 50C and the housing lower portion 50D to form the housing 50.

What is claimed is:

1. A bicycle operation device comprising:
    a clamp attachable to a handlebar of a bicycle, the clamp including a first clamp portion and a second clamp portion and that are attached via a hinged pin;
    a first operation unit including an operation lever, and coupled to the clamp; and
    a second operation unit including a rotatable operating member for rotatably operating an electric switch of the second operating unit, and the second operating unit being attached to the clamp, the first operating unit and the rotatable operating member of the second operating unit both being detachably attached to the clamp at a same one of the first and second clamp portions.

2. The bicycle operation device according to claim 1, wherein
    the second operation unit is detachably and reattachably attached to the clamp so as to be removable from the clamp and reattached to the clamp.

3. The bicycle operation device according to claim 1, wherein
    the first operation unit includes
        a cylinder chamber, and
        a piston movable in the cylinder chamber in accordance with an input to the operation lever.

4. The bicycle operation device according to claim 1, wherein
the second operation unit further includes a wireless communicator.

5. The bicycle operation device according to claim 1, wherein
the second operation unit further includes a power supply.

6. The bicycle operation device according to claim 1, wherein
the second operation unit further includes a notification portion.

7. The bicycle operation device according to claim 1, wherein
the second clamp portion is rotatably coupled to the first clamp portion, and
the bicycle operating device further includes a coupling member coupling the first clamp portion and the second clamp portion so as to hold the handlebar in between.

8. The bicycle operation device according to claim 7, wherein
the first operation unit includes a held portion held between the first clamp portion and the second clamp portion.

9. The bicycle operation device according to claim 8, wherein
the held portion of the first operation unit includes an insertion portion allowing for insertion of the coupling member.

10. The bicycle operation device according to claim 7, wherein
the second operation unit is attached to one of the first clamp portion and the second clamp portion.

11. The bicycle operation device according to claim 10, further comprising
a third operation unit coupled to the other one of the first clamp portion and the second clamp portion.

12. The bicycle operation device according to claim 1, further comprising
an adapter provided between the clamp and the second operation unit.

13. The bicycle operation device according to claim 12, wherein
the adapter is attached to an outer surface of the clamp.

14. The bicycle operation device according to claim 12, wherein
the adapter includes a first attachment portion and a second attachment portion is attached to the clamp, and
the second attachment portion extends from the first attachment portion in a center axis direction of the clamp, and
the second operation unit is attached to the second attachment portion.

15. The bicycle operation device according to claim 14, further comprising
a first position adjustment mechanism configured to adjust a position of the second operation unit in the center axis direction.

16. The bicycle operation device according to claim 15, wherein
the first position adjustment mechanism includes a guide structure guiding the second operation unit in the center axis direction,
the guide structure includes a recess and a projection extending in the center axis direction respectively,
the recess is arranged in one of the second attachment portion and the second operation unit, and
the projection is arranged on the other one of the second attachment portion and the second operation unit.

17. The bicycle operation device according to claim 12, further comprising
a second position adjustment mechanism configured to adjust a position of the adapter along an outer surface of the clamp.

18. The bicycle operation device according to claim 1, wherein
the electric switch includes at least a first switch and a second switch.

19. The bicycle operation device according to claim 18, further comprising
a first operation member,
the first operation member operatively coupled to the first switch to operate the first switch in accordance with movement in a first direction, and
the first operation member operatively coupled to the second switch to operate the second switch in accordance with movement in a second direction differing from the first direction.

20. The bicycle operation device according to claim 18, wherein
the second operation unit further includes a first operation member and a second operation member, the first operation member is configured to operate the first switch, and the second operation member is configured to operate the second switch.

21. The bicycle operation device according to claim 20, wherein
the first operation member includes a first lever pivotally disposed about a first axis, and
the second operation member includes a second lever pivotally disposed about a second axis.

22. The bicycle operation device according to claim 21, wherein
the first lever pivots along a first operation surface orthogonal to the first axis,
the second lever pivots along a second operation surface orthogonal to the second axis, and
the first operation surface and the second operation surface form an angle that is greater than or equal to 20° and less than or equal to 70°.

23. The bicycle operation device according to claim 20, wherein
the first operation member is configured to be operated by a first digit of a user, and
the second operation member is configured to be operated by a second digit of the user.

24. The bicycle operation device according to claim 1, wherein
the electric switch includes only a first switch, and
the second operation unit further includes a first operation member configured to operate the first switch.

25. The bicycle operation device according to claim 19, further comprising
an operation position adjustment mechanism configured to adjust an initial position of the first operation member.

26. A bicycle operation device comprising:
a clamp attachable to a handlebar of a bicycle;
a first operation unit including an operation lever, and coupled to the clamp;
a second operation unit including an electric switch, and attached to the clamp, the electric switch including a first switch and a second switch; and a first operation member, the first operation member operatively coupled to the first switch to operate the first switch in accordance with movement in a first direction, and the first operation member operatively coupled to the second switch to operate the second switch in accordance with movement in a second direction differing from the first direction, the first operation member including
an operation surface used to operate the first switch, and
an additional operation member provided on the first operation member at a position other than the operation surface.

27. The bicycle operation device according to claim 19, further comprising
a reversing structure that allows the first operation member to be arranged on one side of the clamp or the other side of the clamp with respect to a center axis direction of the clamp.

28. The bicycle operation device according to claim 4, wherein
the second operation unit further includes a housing accommodating the wireless communicator and allowing for transmission of a radio wave output from the wireless communicator.

29. The bicycle operation device according to claim 28, wherein
the housing includes a housing front portion serving as a front half of the housing, and a housing rear portion serving as a rear half of the housing, and
the wireless communicator is accommodated in the housing rear portion.

30. The bicycle operation device according to claim 28, wherein
the housing includes a housing front portion serving as a front half of the housing, and a housing rear portion serving as a rear half of the housing, and
the wireless communicator is accommodated in the housing front portion.

31. A bicycle operation device comprising:
a clamp attachable to a handlebar of a bicycle;
a first operation unit including an operation lever, and coupled to the clamp; and
a second operation unit including an electric switch, and attached to the clamp, the second operation unit further includes a wireless communicator, the second operation unit further includes a housing accommodating the wireless communicator and allowing for transmission of a radio wave output from the wireless communicator,
the housing including a housing upper portion serving as an upper half of the housing, and a housing lower portion serving as a lower half of the housing, and
the wireless communicator being accommodated in the housing upper portion.

32. The bicycle operation device according to claim 28, wherein
the housing includes a housing upper portion serving as an upper half of the housing, and a housing lower portion serving as a lower half of the housing, and
the wireless communicator is accommodated in the housing lower portion.

33. The bicycle operation device according to claim 28, wherein
the housing includes a resin material.

34. The bicycle operation device according to claim 5, wherein the second operation unit further includes
a housing including a receptacle configured to at least partially accommodate the power supply, and
a power supply cover covering at least a portion of an opening provided in the receptacle, wherein the power supply cover is attachable to and removable from the housing.

35. The bicycle operation device according to claim 34, wherein
the power supply includes a battery and a battery holder, and
the battery is detachably and reinstallably attached to the battery holder so as to be removable from the battery holder and reinstallable to the battery holder.

* * * * *